ness et al., Continuous Flow Measurement of

United States Patent [19]

Wunderly et al.

[11] Patent Number: 4,916,320

[45] Date of Patent: Apr. 10, 1990

[54] SAMPLE COUNTING SUPPORT WITH SOLID SCINTILLATOR FOR USE IN SCINTILLATION COUNTING

[75] Inventors: Stephen W. Wunderly, Irvine; Joseph F. Quint, Orange, both of Calif.

[73] Assignee: Beckman Instruments, Inc., Fullerton, Calif.

[21] Appl. No.: 88,939

[22] Filed: Aug. 24, 1987

[51] Int. Cl.[4] .............................................. G01T 1/20
[52] U.S. Cl. ................................. 250/483.1; 250/364
[58] Field of Search ............... 250/361 R, 364, 483.1; 252/301.17

[56] References Cited

U.S. PATENT DOCUMENTS

| | | | |
|---|---|---|---|
| 2,985,593 | 5/1961 | Broderick | 252/301.2 |
| 3,010,908 | 11/1961 | Broderick | 252/301.2 |
| 3,134,018 | 5/1964 | Schranz . | |
| 3,150,101 | 9/1964 | Heimbuch | 252/301.2 |
| 3,356,616 | 12/1967 | Sandler | 252/301.2 |
| 3,418,127 | 12/1968 | Millikan | 96/82 |
| 3,418,152 | 12/1968 | Staudenmayer | 117/63 |
| 3,457,180 | 7/1969 | Kretz | 252/301.2 |
| 3,491,235 | 1/1970 | Millikan | 250/49.5 |
| 3,513,102 | 5/1970 | Heidke | 252/301.2 |
| 3,536,914 | 10/1970 | Chapman | 250/71.5 |
| 3,542,588 | 11/1970 | Heidbrink | 117/124 |
| 3,594,217 | 7/1971 | Seybert | 117/119.6 |
| 3,650,976 | 3/1972 | Luckey | 252/301.4 |
| 3,664,839 | 5/1972 | Jones | 96/82 |
| 3,676,360 | 7/1972 | Shamoo | 252/301.2 |
| 3,690,832 | 9/1972 | Plakas | 23/230 B |
| 3,712,827 | 1/1973 | Gramza | 117/33.5 |
| 3,758,412 | 9/1973 | Grum | 252/301.2 |
| 3,896,138 | 7/1975 | Kreider | 252/301.2 |
| 3,928,227 | 12/1975 | Sena | 252/301.2 |
| 4,066,908 | 1/1978 | Farukhi et al. | 250/483.1 |
| 4,127,499 | 11/1978 | Chen et al. | 250/483.1 |
| 4,138,336 | 2/1979 | Mendel | 210/198 |
| 4,275,300 | 6/1981 | Abbott | 250/304 |
| 4,292,272 | 9/1981 | Kitajima | 422/57 |
| 4,293,436 | 10/1981 | Fost | 252/301.1 |
| 4,358,401 | 11/1982 | O'Brien | 252/628 |
| 4,396,528 | 8/1983 | Abbott | 252/301.17 |
| 4,562,158 | 12/1985 | Schellenberg | 250/361 R |
| 4,692,266 | 9/1987 | Costa et al. | 250/364 |

FOREIGN PATENT DOCUMENTS

| | | |
|---|---|---|
| 827202 | 11/1969 | Canada . |
| 0127169 | 5/1984 | European Pat. Off. . |
| 0127866 | 5/1984 | European Pat. Off. . |
| 1241001 | 5/1963 | Fed. Rep. of Germany . |
| 1287232 | 4/1961 | France . |
| 901162 | 11/1958 | United Kingdom . |
| 1213332 | 9/1968 | United Kingdom . |

OTHER PUBLICATIONS

Research Disclosure, Publication 16110, Sep. 1977, Assay for Bilirubins pp. 18–23.
Research Disclosure, Publication 16061, Aug. 1977, Scintillation Counting Compositions and Elements, pp. 42–46.
Journal of Chemical Education, vol. 47, No. 1, Jan. 1970, p. A9.
McGuinness et al., Continuous Flow Measurement of Beta Radiation Using Suspended Scintillators.
Analytical Chemistry, vol. 31, No. 9, Sep. 1959, 1607, Seliger et al, Solid Scintillation Counting of Hydrogen-3 and Carbon-14 in Paper Chromatograms.
The Anspec Company, Inc., AN-700, undated, AN-700 Radioactivity LC Detector.
Beta Analytical, Inc.-Berthold Nuclear Insttrumentation, HPLC-Radioactivity Monitors LB 503 and LB 503-HS-D, undated.
Journal of Paint Technology, vol. 47, No. 602, Mar. 1975, p. 47, "Liquid Scintillation Counting Techniques As Applied to the Study of Glycol Loss From Latex Paint Films" by Dennis Anderson.
Nucleonics, vol. 1, No. 1, Jan. 1953, p. 44, "Two Liquid Scintillation Neutron Detectors" by C. O. Muehlhause and G. E. Thomas, Jr.

*Primary Examiner*—Carolyn E. Fields
*Attorney, Agent, or Firm*—William H. May; Paul R. Harder

[57] ABSTRACT

A sample counting support for scintillation counting of a radioactive labeled sample comprises a base material covered with a thin layer of dry solid scintillator in a substantially permanent form so that the support may receive the sample and produce light emissions in response to particles emitted by a radioactive substance labelling said sample.

20 Claims, 1 Drawing Sheet

SAMPLE COUNTING SUPPORT WITH SOLID SCINTILLATOR FOR USE IN SCINTILLATION COUNTING

FIELD OF THE INVENTION

This invention relates to the measurement of a radioactively labeled sample material by an automated instrument for radioisotope detection and measurement, such as for example, a liquid scintillation counter which detects light emissions generated from a scintillator material responsive to the radioactive substance labeling the sample.

BACKGROUND OF THE INVENTION

Liquid scintillation counting and automated instruments known as liquid scintillation counters are widely utilized to analyze samples having radioactively labeled substances. Generally, a sample in solution is mixed with a liquid scintillator, commonly referred to as a cocktail, and light events produced from the sample and cocktail mixture are detected according to their energy and frequency. The light events are caused when particles, emitted from the radioactive isotope labeling a select substance of the sample in solution are received by a molecule of liquid scintillator. This produces a light emission having an energy characteristic of the radioactive particle received. Detecting the energy of the light events and number of light events in a particular energy range provides an assemblage of information known as a spectrum from which the select substance of the sample, that material which is radioactively labeled, can be quantitatively analyzed. Liquid scintillation counting and automated instruments to perform liquid scintillation counting have been widely discussed in a multitude of publications and patents.

Scintillation counting of liquid samples possesses some characteristic disadvantages due to the nature of the liquid solution which is utilized. One is a phenomenon known as quench. Quench commonly refers to an effect in the scintillation process of the chemical or optical nature which results in loss of light events or reduction in light emission energy. It is in part due to the chemical nature of the solution in which the sample and scintillator are mixed and in part due to the color of the liquid sample solution. The result is inefficiently in the ability of the liquid scintillation counter to accurately count the particle disintegrations of the isotopes identifying the investigated material in the sample, thus, interfering with sample analysis.

Another disadvantage is the use of a liquid in which the radioactive sample and scintillator material, i.e., the cocktail, are intermixed. Following analysis this liquid solution and the vial in which it is held must be disposed of. However, regulations relating to disposal of radioactive materials impact disposal and control of the method in which disposal may be accomplished. This is particularly rigorous for liquid radioactive materials. Generally, samples are of a sufficient volume that specialized disposal methods must be followed which is quite costly. In many cases a solid material having a radioactive nature is treated differently.

SUMMARY OF INVENTION

A sample counting support which can be utilized to display a sample material under a process of scintillation with a solid scintillator is provided, which comprises a base material supporting a solid scintillator. The base material provides a surface upon which the solid scintillator is supported and which may receive a sample. The base material is covered with a thin layer of solid scintillator and may receive a sample having a material labeled with a radioactive substance to cause the scintillation process by which the sample material can be analyzed. The base material may be rigid or flexible, porous or non-porous, so long as it provides an adequate surface upon which the solid scintillator may be coated and retained. Preferably, the base material will be transparent, to permit passage of light emissions from the solid scintillator in all directions. Additionally, filter type material may be utilized to assist in deposition of the solid scintillator compound and/or the sample thereupon.

The solid scintillator may be permanently retained on the base material by a binder material, it may be embedded on the surface of the base material, or it may be chemically attached to the base material. An alternative is to embed the solid scintillator into a base material which is porous during the process of manufacture of such material. The solid scintillator is preferably dried on the surface of the sample counting support for high efficiency in scintillation activity and for ease in handling by a laboratory technician.

DETAILED DESCRIPTION OF THE INVENTION

This invention relates to and is for use in a method of scintillation counting using a solid scintillator as described in a copending patent application for METHOD OF SCINTILLATION COUNTING USING A SOLID SCINTILLATOR filed on the same day herewith in the names of Stephen W. Wunderly and Joseph F. Quint, the inventors, and being Ser. No. 88,938;. A sample counting support for use in scintillation counting of a radioactively labeled sample by means of a solid scintillator comprises two basic parts. The first is a base material which forms a structure for supporting, displaying and retaining the second part, a solid scintillator. The base material also provides a support for the sample which is introduced directly thereon when scintillation counting is to take place.

Figure 1:
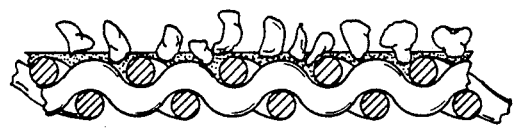
FIG. 1 is a cross-section of a sample counting support which has a base material comprised of a filter type material.
Figure 2:
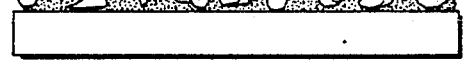
FIG. 2 is a cross-section of a sample counting support which has a base material comprised of a rigid material such as glass.

The base material may be any one of a number of substances which provides an adequate surface area to which the solid scintillator compound may be bonded, adhered, embedded or attached. This material should be inert and nonreactive to the solid scintillator, to the material utilized in deposition of scintillator onto the support, and to the sample and sample carrier material. The base material may be rigid or flexible, porous or nonporous so long as the solid scintillator remains on its surface in storage, transportation or use. For example, as illustrated in FIG. 2 the base material may comprise glass, a plastic, or even a metal. It may, as illustrated in FIG. 1 also be a fibrous material such as paper or a filter material which has particular advantages associated with it for deposition of the solid scintillator and/or a sample constituent that is radioactive labeled. The fibrous and filter paper include all known types which may be constructed of wood pulp, cotton, glass or polypropylene, fiber or other membranes of various ingredients such as PTFE, nylon, polysulfate and cellulose derivatives. A glass fiber filter type support is generally preferred.

It it preferable to utilize a base material which is transparent so that light emissions from the scintillation events are not blocked in any direction and may be passed through the base material to wherever the photodetector of the liquid scintillation instrument resides in the counting chamber of the liquid scintillation instrument. The base material may be formed in any shape that is desirable or beneficial in scintillation counting. Many differing shapes may be utilized for the counting support to provide various advantages in containing the sample material or scintillator, or permitting easy placement of the sample counting support within the counting chamber of a liquid scintillation instrument.

Figure 3:
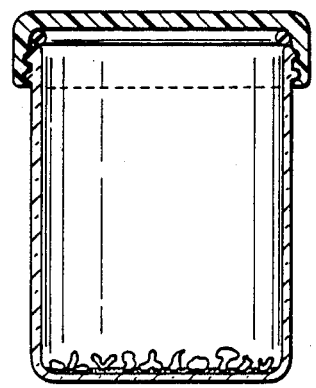
FIG. 3 is a cross-section of a typical liquid scintillation counting vial having a solid scintillator in a thin layer over the flow of the vial.

A standard liquid scintillation counting vial could be used, for instance, as a base material having its interior surface, within the walls, the floor or both coated with solid scintillator. In FIG. 3, the vial is illustrated with the solid scintillator in a thin layer over the flow of the vial.

The solid scintillator is bound to the surface of the base material and may coat either one side or the entire surface of the base material. This may be accomplished by any method which is adaptable to the particular base material selected and compatible with the solid scintillator. For example, if a glass material is selected, the solid scintillator material will be bound to the surface of the glass through use of a suitable binder material. For example, a common binder which may be used is the type which binds silica gel to hard surface backings. Such a binder can be obtained from American Cyanamid, Wayne, N.J., under the trade name CYANAMER N-300. Generic examples are calcium sulfate one half hydrate ($CaSO_4 \cdot \frac{1}{2}H_2O$), polyvinyl alcohol, or polyacrylamide-aqueous type. The same binding method would be used with plastic or metal.

Similarly, with use of a fibrous material or a filter material, the binder as described above would be acceptable on the surface of the fibrous or filter material and retained in place by physical attachment. This could be accomplished, for example, with filter paper by filtering the solid scintillator into the filter paper by a standard laboratory filtering technique. The solution containing the solid scintillator which is filtered could also contain a binding agent which may improve the binding efficiency of the scintillator to the filter material.

A third method by which the solid scintillator could be bound to a base material is through chemical attachment, i.e., chemical bonds. It is possible to chemically bond the solid scintillator to the surface of a base material by chemical binding techniques utilized in column or affinity chromatography packing materials where differing reagents are chemically bonded to a solid support bead to achieve select surface properties or select reactivity properties. One may also use any common linker chemistry, such as are well known for reverse phase chromatography. The solid scintillator would be thus attached by a chemical linker which is generally a molecular chain which has a property at one end to associate with the solid scintillator and a property at the end to associate with the bonding material.

Fourthly, it is possible to embed the solid scintillator into a porous base material as the base material is manufactured. This would be possible with certain plastics and glass which are transparent. The solid scintillator would thus be held within the base material itself and only the sample applied to the surface of the base material.

The solid scintillators which are usable for application to a base material to provide the invention presented herein would be any solid scintillator which is in a particulate form or any volatile liquid scintillator material which dries to a solid form following application to a surface. Examples of the types of solid scintillators usable are as follows: calcium fluoride doped with europium $CaF_2$ (Eu); zinc sulfide doped with silver ZnS (Ag); yttrium silicate doped with cerium $Y_2SiO_5$ (Ce); lithium glass doped with cerium, anthracene; PPO; polystyrene or poly(vinylaryl) functions doped with common liquid scintillation fluors. It is preferable to use a solid scintillator having the smallest particle size available. It has been found that scintillation efficiency is improved by using a finer particle size. In tests a particle size of 2 to 10 microns has shown to have the best performance in scintillation counting.

Preparation of the sample counting support could be by one of the following methods. The first method would be to prepare a slurry of solid scintillator and binder containing 20 milligrams of the solid scintillator and 5 milligrams of binding agent in 10 milliliters of water. The slurry could be filtered through a filter material, which is selected as the base material, whereby the scintillator will coat the surface of the filter paper. The base filter material is then removed and dried and the binder will adhere the solid scintillator to it in a dry from. The filtering process is performed until a sufficient amount of solid scintillator is adhered to the filter base material, yet permitting the base filter material to function in a filtering process for possible application of the sample material by the same method.

A second method would be to use a slurry of binder and solid scintillator and coat the slurry onto the surface of a base material which may be selected as glass, plastic, filter material, etc. The slurry would be prepared by dissolving 10 mg binder in 20 ml of water and mixing 10 grams of solid scintillator with 20 ml methanol; and adding the binder solution. The slurry is coated to a thickness such that the final weight of the scintillator and binder is within the range of 20 milligrams to 120 milligrams for a 25 millimeter diameter circle, the optimum being about 50 milligrams for the same diameter circle. After coating the slurry it is again dried leaving the solid scintillator bound to the surface of the base material in a dry form. This method may be more preferable than the first method to obtain a uniform distribution of the solid scintillator. The scintillator should, of course, be distributed across the surface of the base material in a manner that is as uniform as possible to assure that efficiency in scintillation counting is not affected by the distribution of the solid scintillation material.

A third method would be to dip the base material into the slurry of solid scintillator and binder described for method two. This would coat the entire surface of the base material. The coating thickness of the solid scintillator could be controlled by the viscosity of the slurry.

Once the sample counting support is prepared by deposition of the solid scintillator on the base material in a dried form, the sample counting support may be utilized for scintillation counting by applying a sample directly to the surface in a manner that is compatible with both the sample material and its solution, the scintillator and its binding to the support, and in consideration of the type of base material utilized. The sample is then dried. This provides highly efficient interaction between the radioactive isotope labeling the sample material and the solid scintillator due to the intimate contact of these dried substances. For instance, if a sample counting support is made utilizing glass as a base material, the radioactively labeled sample can be spotted, blotted or dabbed, directly onto the surface of the support. The sample is then dried and the sample counting support introduced into the counting chamber of a scintillation counter for sample analysis. If, for example, the sample counting support is made utilizing a filter material as a base material, the sample counting support may be utilized in a filtering process to deposit the radioactively labeled sample material onto the support, the support then dried and again introduced into the counting chamber of a scintillation counter to analyze the sample. Additionally, if the sample counting support is made of a porous material, such as for example paper, etc., the radioactively labeled sample material may be described into or onto the support, then dried and analyzed.

What is claimed is:

1. A sample counting support for use in scintillation counting of a radioactively labeled sample, in a liquid scintillation counter, comprising a support material having a surface for receiving a solid scintillator compound, said solid scintillator compound being doped yttrium silicate and adhering to said support material and forming a layer of dry solid scintillator compound thereon, said layer being means for receiving and intimately contacting a sample having a material labeled with a radioactive isotope, said solid scintillator compound producing light events in response to particle emissions from the radioactive isotope for measurement by the liquid scintillator counter to analyze the sample.

2. The sample counting support of claim 1 wherein said support material is transparent to light.

3. The sample counting support of claim 1 wherein said support material is a filter material.

4. The sample counting support of claim 1 wherein the support material is not impregnated with the scintillating compound.

5. The sample counting support of claim 1 wherein the layer forms a substantially uniform surface.

6. A sample counting support for use in scintillation counting of a radioactively labeled sample, in a liquid scintillation counter, comprising a filter support material having a surface for receiving a solid scintillator inorganic compound, said solid scintillator inorganic compound adhering to said support material and forming a layer of dry solid scintillator inorganic compound thereon, said layer being means for receiving and intimately contacting a sample having a material labeled with a radioactive isotope, said solid scintillator compound producing light events in response to particle emissions from the radioactive isotope for measurement by the liquid scintillation counter to analyze the sample.

7. The sample counting support of claim 6 wherein the compound is selectively one or more of calcium fluoride doped with europium; zinc sulfide doped with silver; yttrium silicate doped with cerium; or lithium glass doped with cerium.

8. The sample counting support of claim 6 wherein the layer forms a substantially uniform surface.

9. A sample counting support for use in scintillation counting of a radioactively labeled sample, in a liquid scintillation counter, comprising a support material having a surface for receiving a solid scintillator inorganic compound, said solid scintillator compound adhering to said support material and forming a layer of dry solid scintillator compound thereon, said layer being means for receiving and intimately contacting a sample having a material labeled with a radioactive isotope, said solid scintillator compound producing light events in response to particle emissions from the radioactive isotope for measurement by the liquid scintillation counter to analyze the sample.

10. The sample counting support of claim 9 wherein the compound is selectively one or more of calcium fluoride doped with europium; zinc sulfide doped with silver; yttrium silicate doped with cerium; or lithium glass doped with cerium.

11. The sample counting support of claim 9 wherein said support material is transparent to light.

12. The sample counting support of claim 11 wherein said support material is glass.

13. The sample counting support of claim 11 wherein said support material is plastic.

14. A sample counting support of claim 9 wherein said support material is a fibrous material.

15. The sample counting support of claim 9 wherein said solid scintillator compound is bound to said support material through use of a binder material.

16. The sample counting support of claim 15 wherein said binder material is calcium sulfate anhydrate.

17. The sample counting support of claim 15 wherein said binder material is polyvinyl alcohol.

18. The sample counting support of claim 15 wherein said binder material is polyacrylamide.

19. The sample counting support of claim 9 wherein the layer forms a substantially uniform surface.

20. The sample counting support of claim 9 wherein said support material is a filter material and said filter material is constructed of plastic fibers, said plastic fibers selectively being polypropylene, PTFE, nylon, or polysulfone.

* * * * *